United States Patent
Yamamoto et al.

[19]

[11] Patent Number: 6,104,691
[45] Date of Patent: Aug. 15, 2000

[54] OBJECTIVE LENS UNIT AND RECORDING/REPRODUCTION APPARATUS

[75] Inventors: Kenji Yamamoto, Tokyo; Isao Ichimura, Kanagawa; Fumisada Maeda, Tokyo; Toshio Watanabe, Kanagawa; Kiyoshi Ohsato, Chiba, all of Japan

[73] Assignee: Sony Corporation, Japan

[21] Appl. No.: 08/964,011

[22] Filed: Nov. 4, 1997

[30] Foreign Application Priority Data

Nov. 14, 1996 [JP] Japan .................................. 8-303238

[51] Int. Cl.$^7$ ........................................................ G11B 7/00
[52] U.S. Cl. .............................................. 369/118; 369/112
[58] Field of Search ............................. 369/44.22, 44.23, 369/44.24, 54, 58, 109, 112, 117, 118

[56] References Cited

U.S. PATENT DOCUMENTS

| 5,659,533 | 8/1997 | Chen et al. | ......................... 369/109 X |
| 5,699,341 | 12/1997 | Sugi et al. | ......................... 369/118 X |

*Primary Examiner*—Paul W. Huber
*Attorney, Agent, or Firm*—Rader, Fishman & Grauer; Ronald P. Kananen

[57] ABSTRACT

The present invention provides an objective lens unit which can be simultaneously adjusted to an NA specification and a substrate thickness of an optical recording medium.

The objective lens unit for applying a beam to an optical recording medium so as to read and/or record from/to the optical recording medium includes: a first lens; a second lens; a cylindrical frame for movably supporting the second lens with respect to the first lens in a direction of an optical axis; and diaphragm means provided in the vicinity of the second lens and movable together with the second lens in the direction of the optical axis, for shading a part of the beam to be applied to the optical recording medium.

The present invention also provides a recording/reproduction apparatus having the aforementioned objective lens unit, enabling to preferably write and read a data signal into/from an optical recording medium of different specifications.

25 Claims, 6 Drawing Sheets

OBJECTIVE LENS UNIT AND RECORDING/REPRODUCTION APPARATUS

BACKGROUND OF THE INVENTION

1. Field of the Invention

The present invention relates to an objective lens unit and a recording/reproduction apparatus employing this objective lens unit for carrying out recording and reproduction of a data signal onto/from an optical recording medium such as an optical disk.

2. Description of the Prior Art

An optical recording medium such as an optical disk, magneto-optical disk and an optical card has been widely used for storing data such as dynamic image data, voice data, and computer data, because such an optical recording medium can be produced by mass production at reasonable costs. The rapid progress of our information-oriented society requires a higher recording density and a larger capacity of the optical recording medium.

In order to increase the recording density of a data signal in such an optical recording medium, it is effective to reduce the wavelength of the laser beam used to read out the data signal and to use an objective lens having an enhanced NA (numerical aperture) for focusing the laser beam on a magnetic disk. This is because the minimum size of a beam spot formed by focusing the laser beam cannot be reduced lower than $\lambda/NA$ ($\lambda$:wavelength of the beam) because of the diffraction.

As for the reduced wavelength of the laser beam, a blue laser diode and blue or green SHG laser are now under development. As for the enhanced NA of the objective lens, an objective lens used for a so-called "compact disk (CD)" (a digital optical disk for an audio signal or a computer) has a NA of 0.45, whereas an objective lens used for a so-called digital video disk (DVD) (digital optical disk for a video signal) having a higher recording density than the "compact disk" has a NA of 0.6.

It should be noted that in the digital video disk, with the purpose of reducing the effects of frame aberration caused by a disk inclination, the thickness of a transparent disk substrate is 0.6 mm which is half of the thickness 1.2 mm of a transparent disk substrate used in the "compact disk (CD)" and the magneto-optical disk.

In order to realize a data signal recording density than the aforementioned digital video disk, it is necessary to provide an objective lens unit having a NA exceeding 0.6.

The objective lens unit should be adjusted corresponding to the optical recording media of the respective specifications with different thicknesses of the transparent substrate and different NA values. Here the adjustment of the NA is especially important because the frame aberration caused by disk inclination is increased in proportion to the cube of the NA and the thickness of the transparent disk substrate.

In order to cope with the respective thicknesses of transparent substrate in the aforementioned recording media of different specifications, it is necessary to prepare a plurality of lenses having different NA values, or to insert a diffraction-type hologram in the optical path. In these methods, the NA is defined in the stage of designing the lens or hologram corresponding to each of the specifications of the optical recording media.

The aforementioned objective lens unit is adjusted independently for each of the different specifications of the optical recording media. That is, it is necessary to prepare lenses for the respective thicknesses of the transparent substrate of the optical recording media and the respective NA values, or to employ the diffraction-type hologram.

In a case when preparing a plurality of lenses, it is necessary to exchange lenses each time when the aforementioned optical recording medium is changed. Moreover, it is difficult to design a compact objective lens unit having a plurality of lenses. On the other hand, there is also a problem to employ the aforementioned diffraction-type hologram in the aspects of costs and technology.

SUMMARY OF THE INVENTION

It is therefore an object of the present invention to provide an objective lens unit which is simultaneously adjusted to the NA specification and the substrate thickness of the optical recording medium.

Another object of the present invention is to provide a recording/reproduction apparatus provided with the aforementioned objective lens unit according to the present invention, enabling to preferably write and read a data signal into/from an optical recording medium of different specifications.

DETAILED DESCRIPTION OF THE PREFERRED EMBODIMENTS

Description will now be directed to embodiments of the present invention with reference to the attached drawings.

Figure 1:
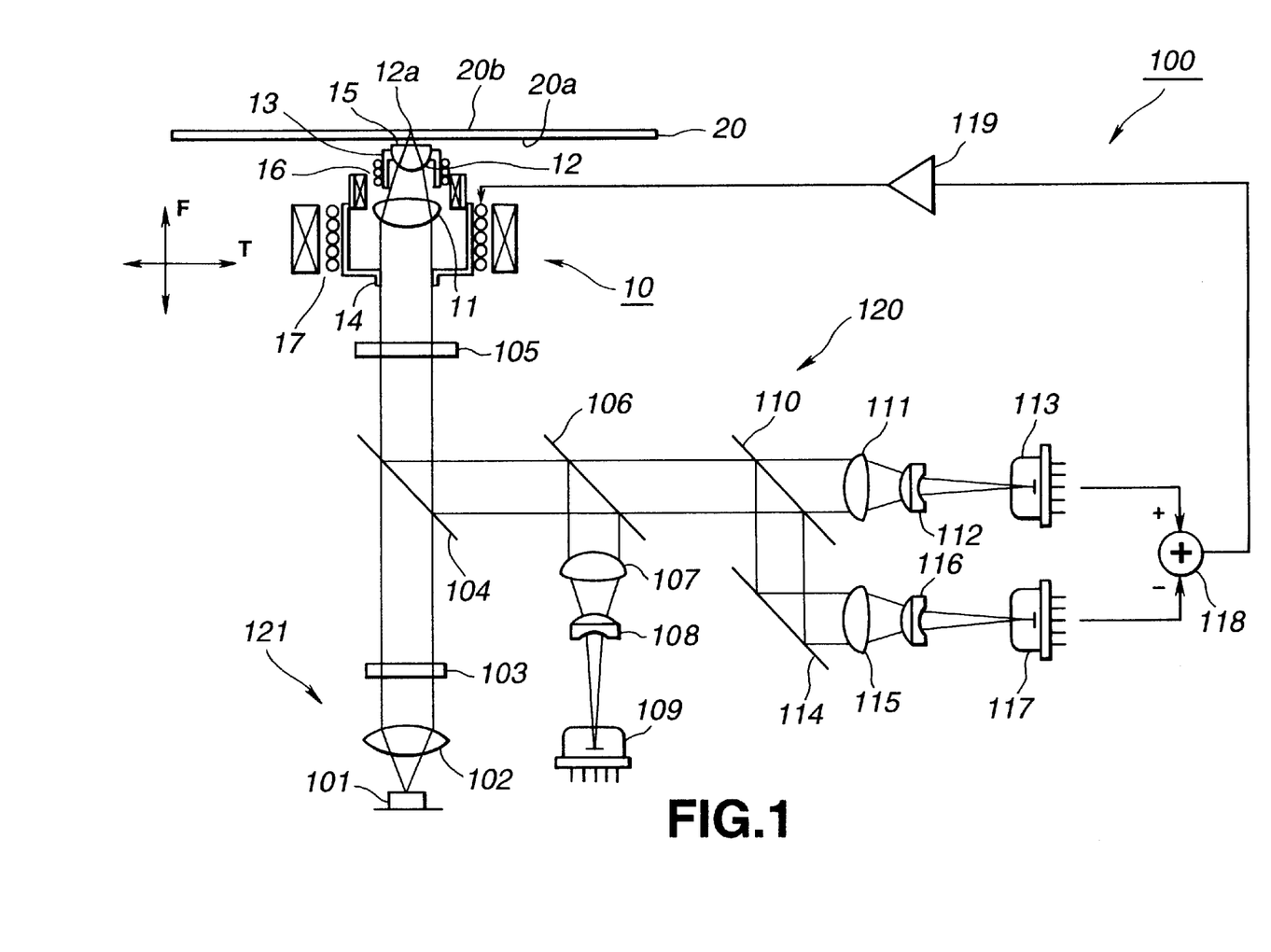
FIG. 1 is a side view which schematically shows the entire configuration of a recording/reproduction apparatus provided with an objective lens unit according to the present invention.

FIG. 1 shows the entire configuration of a recording/reproduction apparatus provided with an objective lens unit according to the present invention, including: a beam-emitting section 121, an objective lens unit 10, a beam-receiving section 120, and an optical recording medium such as an optical disk 20. The beam-emitting section 121 generates a beam of circular polarization which has been modulated for a data signal. The objective lens unit 10 focuses the beam from the beam-emitting section 121 on the optical disk 20. The objective lens unit 10 collects light reflected from the optical disk 20 into a beam. The beam-receiving section 120 receives the beam and converts it into a data signal and an other servo signal.

The beam-emitting section 121 consists of a light source 101, a collimator lens 102, a diffraction grating 103, a polarized beam splitter 104, and a quarter wavelength ($\lambda/4$) plate 105. The light source 101 may be, for example, a semiconductor laser. Light generated from this light source 101 is made into a parallel beam by the collimator lens 102.

The beam is further made into a linearly polarized beam by the diffraction grating 103, and then passes through the polarized beam splitter 104. The beam is converted by the λ/4 plate 105 into a circular polarized beam which is introduced into the objective lens unit.

The objective lens unit 10 consists of a first objective lens 11, a second objective lens 12, a cylindrical frame 13 for holding the second lens 12 in such a manner that the second lens can move in the direction of the optical axis with respect to the first lens 11, a first diaphragm 14, a second diaphragm 15, a second lens drive mechanism (actuator) 16, and an objective lens drive mechanism (actuator) 17. This objective lens unit 10 receives the beam generated by the beam-emitting section 121 and defines the distance of the beam from the optical axis which is called an incident height. This beam is focused by the first lens 11 and further focused by the second lens 12 which is a convex lens having a convex spherical surface of a predetermined radius of curvature into which the beam is introduced and a flat surface 12a opposing to and in proximity to an incident plane 20a of the optical disk 20. The beam is then limited to a predetermined diameter and introduced to a signal recording plane 20b of the optical disk 20. It should be noted that the first lens and the second lens are arranged so that their optical axes coincide.

The second lens 12 is moved by the second lens drive mechanism 16 so that a small spacing between the plane 12a and the incident plane 20a is constant. That is, a thin air layer (air gap) is formed between the plane 12a and the incident plane 20a.

The objective lens unit 10 is moved by the objective lens drive mechanism 17 in a direction of the optical axis (focusing direction indicated by an arrow F in FIG. 1) and in a direction which orthogonally intersects the optical axis (tracking direction indicated by an arrow T in FIG. 1) so that the beam after passing through the second lens 12, always forms a beam, spot on a recording track of the signal recording plane 20b of the optical disk 20. That is, the aforementioned beam is always focused on the aforementioned recording track. The objective lens drive mechanism 17 is operated according to a detection signal (error signal) generated according to a beam reflected from the aforementioned signal recording plane. The second lens drive mechanism 16 operates according to a change of thickness of the transparent substrate of the optical disk 20 so that the aforementioned air gap has a constant thickness.

The optical disk 20 has a transparent layer 20c defined by the incident plane 20a and the signal recording plane 20b. This transparent layer 20c constitutes a substrate having a thickness from 0.1 mm to 0.6 mm according to the recording density of the signal recording layer. Consequently, the objective lens unit 10 is required to have a characteristic corresponding to the disk type, such as the NA (numerical aperture). The beam radiated from this objective lens unit 10 enters the incident plane 20a and the transparent layer 20c and is focused on the signal recording plane 20b.

A beam reflected from this signal recording plane 20b of the optical disk 20 again enters the objective lens unit 10 and is focused by the second lens 12. The beam passes through the first lens 11 so as to be made into a parallel beam which is emitted from this objective lens unit 10. This reflected beam reaches the quarter wavelength plate 105 where the beam is returned from the circular polarization into a linear polarization. Note that the polarization direction of this beam orthogonally intersects the polarization direction when the beam has entered the objective lens unit 10. The reflected beam is separated by the polarized beam splitter 104 from the beam emitted from the beam-emitting section 121 and entering the objective lens unit 10, and the separated beam is introduced to the beam-receiving section 120.

The beam-receiving section consists of a first half mirror 106, a first focusing lens 107, a first multi-lens 108, a first optical detector 109, a second half mirror 110, a second focusing lens 111, a second multi-lens 112 a second optical detector 113, a mirror 114, a third focusing lens 115, and a third multi-lens. The aforementioned beam coming out of the objective lens unit 10' which has been separated by the beam splitter' is introduced to the beam-receiving section 120, reaching the first half mirror 106.

A part of the reflected beam which has reached the first half mirror 106 passes through the focusing lens 107 and the multi-lens 108 and is focused on the light-receiving surface of the first optical detector. The multi-lens is a lens consisting of a cylindrical lens and a convex lens incorporated into a single lens, causing astigmatism in the aforementioned reflected beam and focusing the reflected beam on the light-receiving surface of the first optical detector 109.

The first optical detector 109 has a light-receiving surface divided into a plurality of planes (6 planes for example). Optical detection outputs from these light-receiving planes' are used for a calculation processing to create an RF signal which is a signal read from the optical recording medium 20, and error signals' including a focus error and a tracking error.

The objective lens drive mechanism 17 moves the objective lens unit 10 according to the aforementioned focus error signal so as to keep a focused state of the beam on the signal recording plane 20b. Moreover, the objective lens drive mechanism 17 moves the objective lens unit 10 in the aforementioned tracking direction according to the aforementioned tracking error signal so that the aforementioned beam is radiated onto the recording track.

The reflected beam which has passed the first half mirror 106 reaches the second half mirror 110. The second half mirror 110 divides the reflected beam into two parts. A part of the beam which has passed this second half mirror 110 further passes the second focusing lens 11 and the second multi-lens 112, reaching the second optical detector 113. Another part of the beam which has been reflected by the second half mirror 110 is directed to the mirror 114, the third focusing lens 115, and the third multi-lens 116, reaching the third optical detector 117.

The second optical detector 113 whose position is adjusted in the direction of an optical path detects the reflected beam from the incident plane 20a. The third optical detector 117 whose position is adjusted in the direction of an optical path detects a reflected beam from the plane 12a. The optical detection outputs from the second optical detector 113 and the third optical detector 117 are subjected to a subtraction processing by a subtracter 118. An output from this subtracter 118 is supplied to an actuator driver 119.

The actuator driver drives the second lens drive mechanism 16 according to the output from the subtracter 18, so as to keep constant the thickness of the air gap between the plane 12a and the incident plane 20a.

The second lens drive mechanism 16 thus serves to keep the air gap thickness constant as well as to adjust the NA of the objective lens unit 10 by moving the second lens 12 and the second diaphragm 15 provided on this second lens 12. If a movement range of the second lens 12 for keeping the air gap thickness constant according to the change of the thickness of the transparent substrate layer 20c is compared to a movement range of the second lens 12 for adjusting the NA, the latter is significantly greater than the former. However, these two movements can be operated by the second lens drive mechanism 16 alone.

Description will now be directed to details of the aforementioned objective lens unit 10 with reference to the attached drawings.

Figure 2:
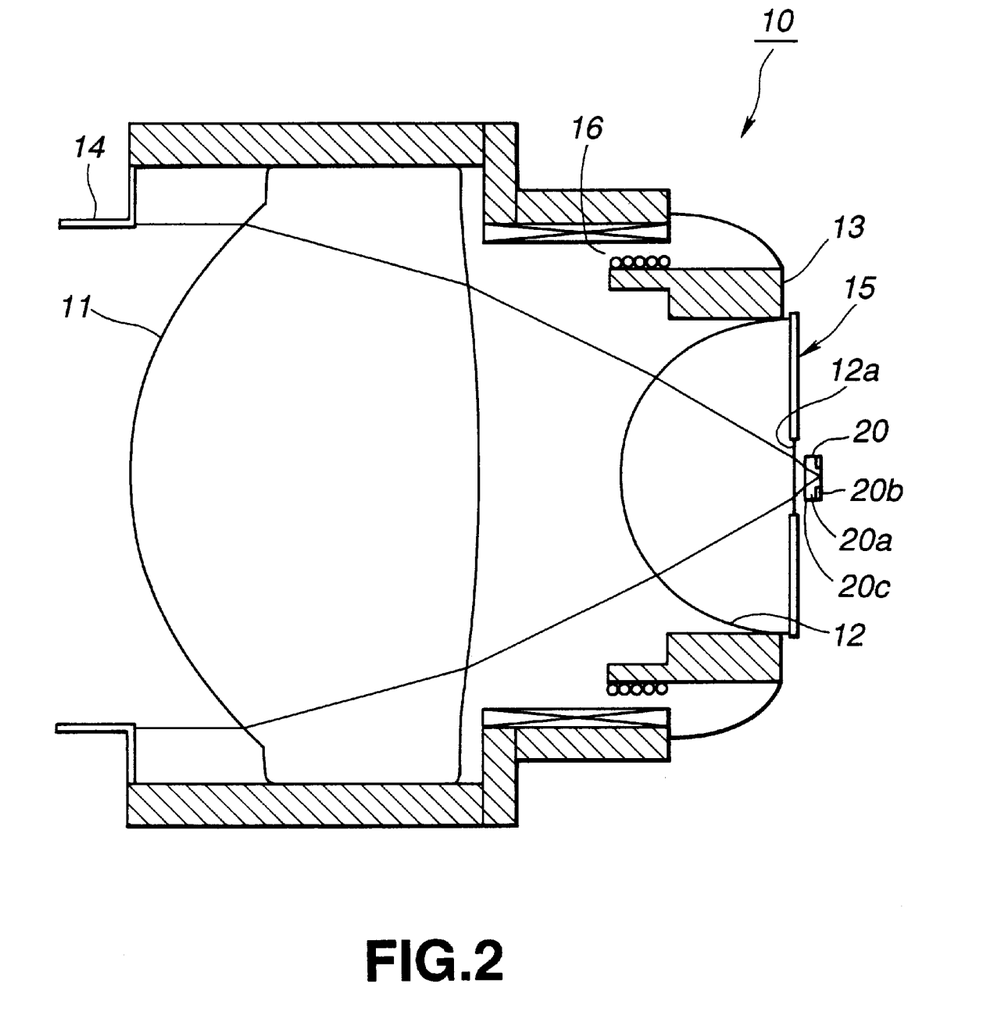
FIG. 2 is a cross-sectional view of the objective lens unit which has been adjusted for a thin-substrate disk.

As shown in FIG. 2, in the objective lens unit 10 according to an embodiment of the present invention, the second lens 12 opposing opposite to and in proximity to the incident plane 20a of the optical disk 20 is a convex lens having a convex spherical plane of a predetermined diameter of curvature for receiving light and a flat plane 12a.

This second lens 12 is designed to have such a reference thickness that the beam from the first lens 11 is focused on the signal recording plane 20b of the optical disk 20 when the beam has vertically entered the convex spherical plane, or is designed to have some additional thickness to this reference thickness. This convex lens 12 has a characteristic that even if the NA is set high, an aberration caused by a thickness error of the optical recording medium such as the optical disk 20 is small. In a case when the second lens 12 has an additional thickness to this reference thickness, it is possible to obtain a larger allowance for the incident beam from out of the optical axis, inclination of the optical axis with respect to the first lens 11, and eccentricity of the optical axis of this second lens 12, suppressing generation of the aberration.

The second lens 12 is provided with the aforementioned second diaphragm 15 on a plane 20a opposite to and in proximity to the optical disk 20. This second diaphragm is formed, for example, by deposition of a metal film. The second diaphragm 15 limits by a predetermined diameter the beam entering the convex spherical surface of the second lens 12. That is, for a beam having a diameter greater than that of the second diaphragm 15, the incident angle to the optical disk 20 is decreased, lowering the NA for such a beam.

The second lens 12 is supported in a movable manner with respect to the first lens 11 in the direction of the optical path. The spacing between the second lens 12 and the first lens 11 can be adjusted by the second lens drive mechanism (actuator) 16. This adjustment enables to cope with different thicknesses of the substrate (transparent layer) 20c of the optical disk 20.

As has been described above, it is required to increase the recording density of a data signal on the optical recording medium and to enhance the NA. Currently, there are some standard specifications for the optical recording medium. Among these standard specifications, the present embodiment shows examples of a thin-substrate disk having a substrate (transparent layer 20c) thickness of 0.1 mm and NA of 0.77 and a DVD disk having a transparent substrate layer 20c with thickness of 0.6 mm and NA of 0.6.

In the objective lens unit 10 according to the present embodiment, the first diaphragm 14 or the effective diameter of the cylindrical frame corresponds to the substrate thickness and NA of the aforementioned thin-substrate disk, whereas the second diaphragm 15 corresponds to the substrate thickness and NA of the aforementioned DVD disk. The spacing between the first lens 11 and the second lens 12 is adjusted according to the substrate thickness and NA of the aforementioned thin-substrate disk and the DVD disk. That is, the second lens 12 is moved by the second lens drive mechanism 16 in the direction of the optical axis.

FIG. 2 shows the objective lens unit 10 which has been adjusted for the aforementioned thin-substrate disk 20. Corresponding to this thin-substrate disk, the spacing between the first lens 11 and the second lens 12 is set to a large value by using the second lens drive mechanism 16. Because the beam in the second lens 12 is not shaded by the second diaphragm 15, the NA has not been reduced. The objective lens unit 10 thus adjusted for the thin-substrate disk has following lens data shown below.

TABLE 1

| Face No. | RDY (radius of curvature) | Thickness (spacing) | Effective diameter |
|---|---|---|---|
| OBJ | Infinity | Infinity | 3.957 |
| STO1 | Infinity | 0.0 | 3.957 |
| 2 | Aspheric surface | 2.600 | 3.957 |
| 3 | Aspheric surface | 1.113 | 3.023 |
| 4 | 1.25 | 1.300 | 1.550 |
| STO2 | Infinity | 0.086 | 3.25 |
| 6 | Infinity | 0.1 | 0.115 |
| 7 | Infinity | 0.0 | 0.002 |
| IMG | Infinity | 0.0 | 0.002 |

TABLE 2

| | |
|---|---|
| NA (numerical aperture) | 0.77 |
| Focal distance (mm) | 2.569 |
| Wave front aberration (rmsλ) | 0.013 |
| Full aperture (mm) | 3.9571 |
| Wavelength (nm) | 680 |

In Table 1, in the column labeled Face NO., OBJ represents an object in infinity; STO1, the first diaphragm 14; STO2, the second diaphragm 15; and the image surface IMG corresponds to the aforementioned signal recording plane 20b. Moreover, face No. 2 and face No. 3 represent the first lens 11; face No. 4 represents the convex spherical surface of the second lens 12; face No. 6 and face No. 7 correspond to the incident plane 20a and the other plane of the aforementioned thin-substrate disk 20, respectively.

Table 2 shows NA values, focal distance, wave front aberration, full aperture, and wavelength of the objective lens unit 10 which has been adjusted for the aforementioned thin-substrate disk.

Figure 3:
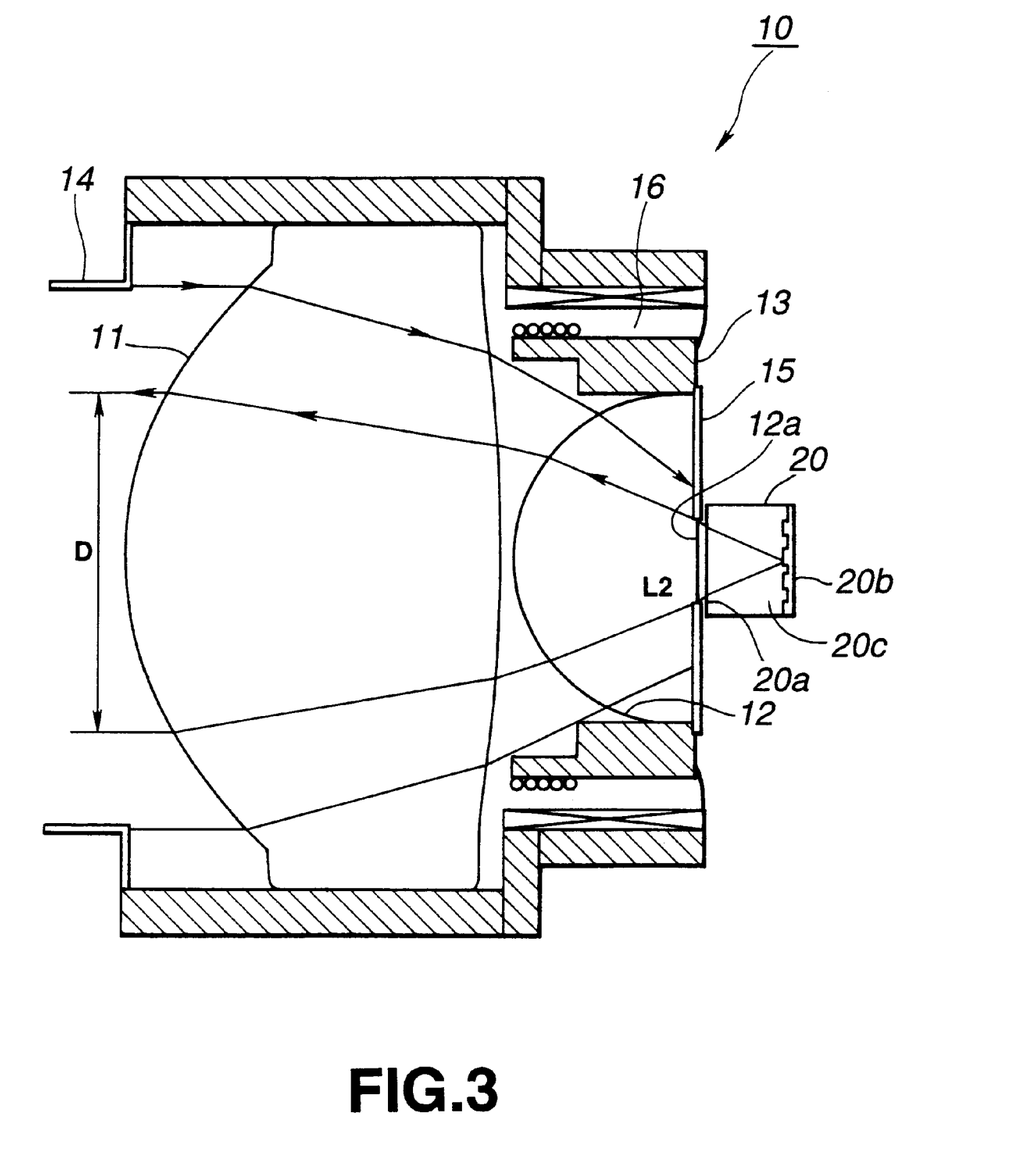
FIG. 3 is a cross-sectional view of the objective lens unit which has been adjusted for a DVD disk.

The objective lens unit 10 is adjusted according to the substrate thickness of the optical disk 20 by the second lens drive mechanism 16 and simultaneously with this, it is possible to adjust the NA by using the second diaphragm 15. FIG. 3 shows the objective lens unit 10 whose NA has been adjusted for the specification of the DVD disk by the second diaphragm 15. The beam diameter is reduced from the diameter of the first diaphragm 14 to D by the second diaphragm 15. Consequently, the NA of this objective lens unit 10 is lowered. Moreover, corresponding to the substrate thickness of the aforementioned DVD disk, the spacing between the first lens 11 and the second lens 12 of the objective lens unit 10 has been set narrow by the second lens drive mechanism 16. This objective lens unit 10 has lens data as follows.

TABLE 3

| Face No. | RDY (radius of curvature) | Thickness (spacing) | Effective diameter |
|---|---|---|---|
| OBJ | Infinity | Infinity | 3.957 |
| STO1 | Infinity | 0.0 | 3.957 |
| 2 | Aspheric surface | 2.600 | 3.957 |
| 3 | Aspheric surface | 0.168 | 3.023 |

TABLE 3-continued

| Face No. | RDY (radius of curvature) | Thickness (spacing) | Effective diameter |
|---|---|---|---|
| 4 | 1.25 | 1.300 | 2.154 |
| STO2 | Infinity | 0.035 | 1.062 |
| 6 | Infinity | 0.1 | 0.864 |
| 7 | Infinity | 0.0 | 0.033 |
| IMG | Infinity | 0.0 | 0.033 |

TABLE 4

| | |
|---|---|
| NA (numerical aperture) | 0.60 |
| Focal distance (mm) | 2.047 |
| Wave front aberration (rmsλ) | 0.004 |
| Full aperture (mm) | 3.9571 |
| Wavelength (nm) | 680 |

In Table 3, like in Table 2, in the face No. column, OBJ resents an object in infinity; STO1, the first diaphragm 14; ST)2, the second diaphragm 15; image surface IMG corresponds to the signal recording plane 20b. Moreover, face No. 2 and face No. 3 correspond to the first lens 11; face No. 4 represent the convex spherical surface of the second lens; and face No. 6 and face No. 7 correspond to the incident plane 20a and the other plane of the transparent layer of the DVD disk. Here, the effective diameter at the second diaphragm of face No. STO2, which was 1.062 mm in Table 3, has become 0.325. Thus, the second diaphragm is functioning.

Table 4 shows NA values, focal distance, wave front aberration, full aperture, and wavelength of the objective lens unit 10 which has been adjusted for the DVD disk. The objective lens unit 10 has an NA of 0.60 which corresponds to the specification of the DVD disk.

Thus, the objective lens unit 10 adjusts the distance between the lenses for adjustment corresponding to the substrate thickness of the optical disk 20 and uses the second diaphragm 15 for adjustment of the NA. That is, the objective lens unit 10 can simultaneously make adjustments for the substrate thickness and the NA depending on the specifications of the optical recording medium.

Figure 4:
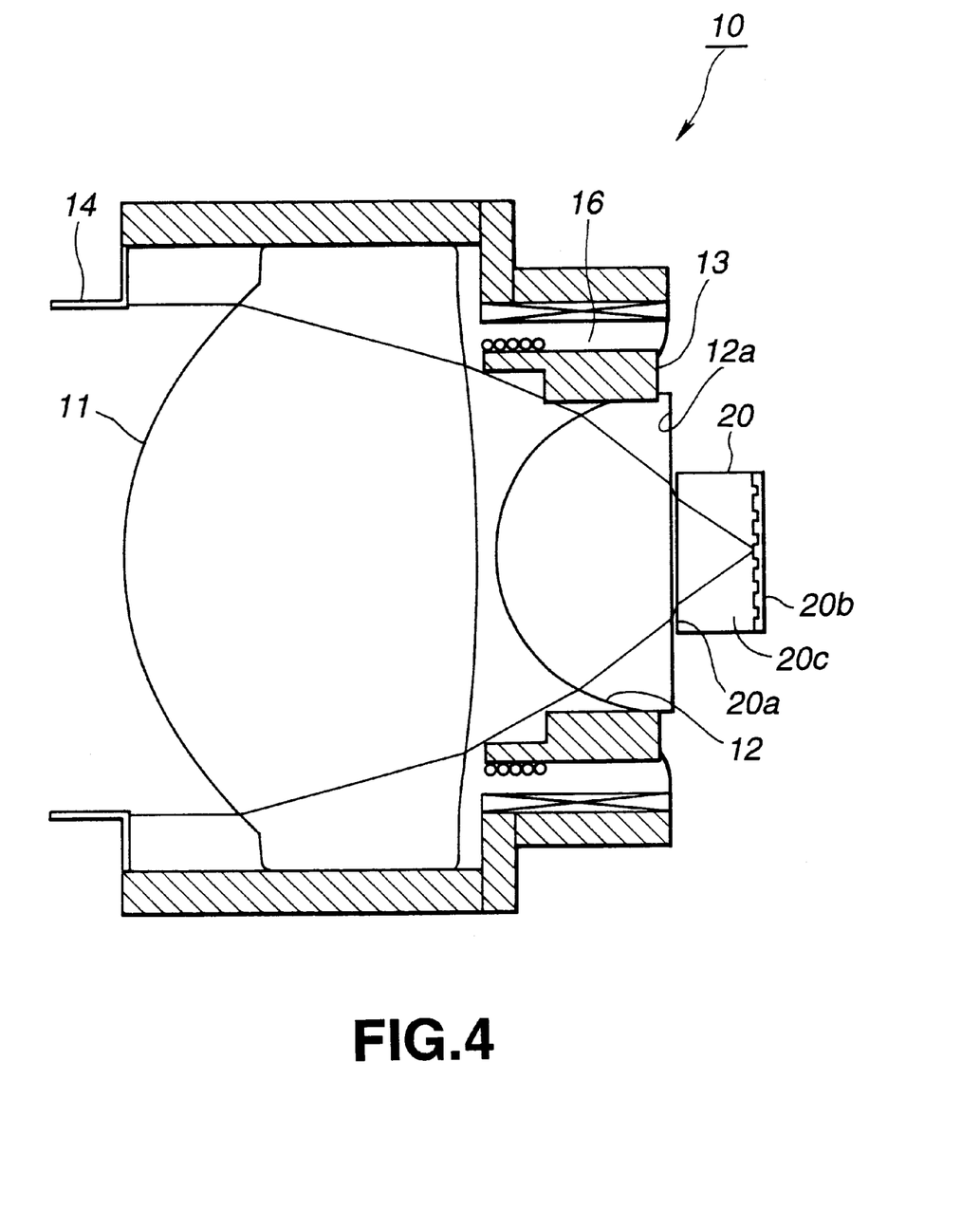
FIG. 4 is a cross-sectional view of the objective lens unit which has been adjusted for the DVD disk and in which a diaphragm on the plane opposing to the DVD disk is excluded.

FIG. 4 shows the object lens unit 10 from which the second diaphragm 15 has been removed. That is, adjustment has been made for the substrate thickness of the DVD disk alone, and no adjustment has been made for the NA. Cohen compared to FIG. 3, a beam including rays far from the optical axis is radiated to the optical disk 20 because the second diaphragm 15 has been removed. The incident angle viewed from the DVD disk is large and accordingly, the NA is also large. However, because the incident beam has not been limited, the aberration is large when compared to the case provided with the second diaphragm 15. Here, like in FIG. 3, the DVD disk 20 has a substrate thickness of 0.6 mm and the NA is 0.94. In the objective lens unit 10, corresponding to the DVD disk 20, the spacing between the first lens 11 and the second lens 12 has been reduced by the second lens drive mechanism 16. In this case, the NA is not lowered and is a value greater than the specification of the DVD disk 20. The objective lens unit 10 in this state shows lens data as follows.

TABLE 5

| Face No. | RDY (radius of curvature) | Thickness (spacing) | Effective diameter |
|---|---|---|---|
| OBJ | Infinity | Infinity | 2.457 |
| STO1 | Infinity | 0.0 | 2.457 |
| 2 | Aspheric surface | 2.600 | 2.457 |
| 3 | Aspheric surface | 1.113 | 1.687 |
| 4 | 1.25 | 1.300 | 1.498 |
| STO2 | Infinity | 0.086 | 0.5862 |
| 6 | Infinity | 0.1 | 0.4954 |
| 7 | Infinity | 0.0 | 0.0006 |
| IMG | Infinity | 0.0 | 0.0006 |

TABLE 6

| | |
|---|---|
| NA (numerical aperture) | 0.94 |
| Focal distance (mm) | 2.096 |
| Wave front aberration (rmsλ) | 0.153 |
| Full aperture (mm) | 3.9571 |
| Wavelength (nm) | 680 |

In Table 5, like in Table 1, in column of face NO., OBJ represents an object in the infinity; STO1, the first diaphragm 14; STO2, the second diaphragm 15; and the image surface IMG corresponds to the aforementioned signal recording plane 20b. Moreover, face No. 2 and face No. 3 represent the first lens 11; face No. 4 represents the convex spherical surface of the second lens 12; face No. 6 and face No. 7 correspond to the incident plane 20a and the other plane of the aforementioned thin-substrate disk 20, respectively. Here, the effective diameter in the second diaphragm of face No. STO2 is 1.062 mm.

Table 6 shows NA values, focal distance, wave front aberration, full aperture, and wavelength of the objective lens unit 10. The objective lens unit 10 has the NA of 0.94 which is greater than the specification 0.60 of the DVD disk 20. In this state, the aberration is too great and an error may be caused in reading and writing a data signal from/to the DVD disk 20.

Figure 5:
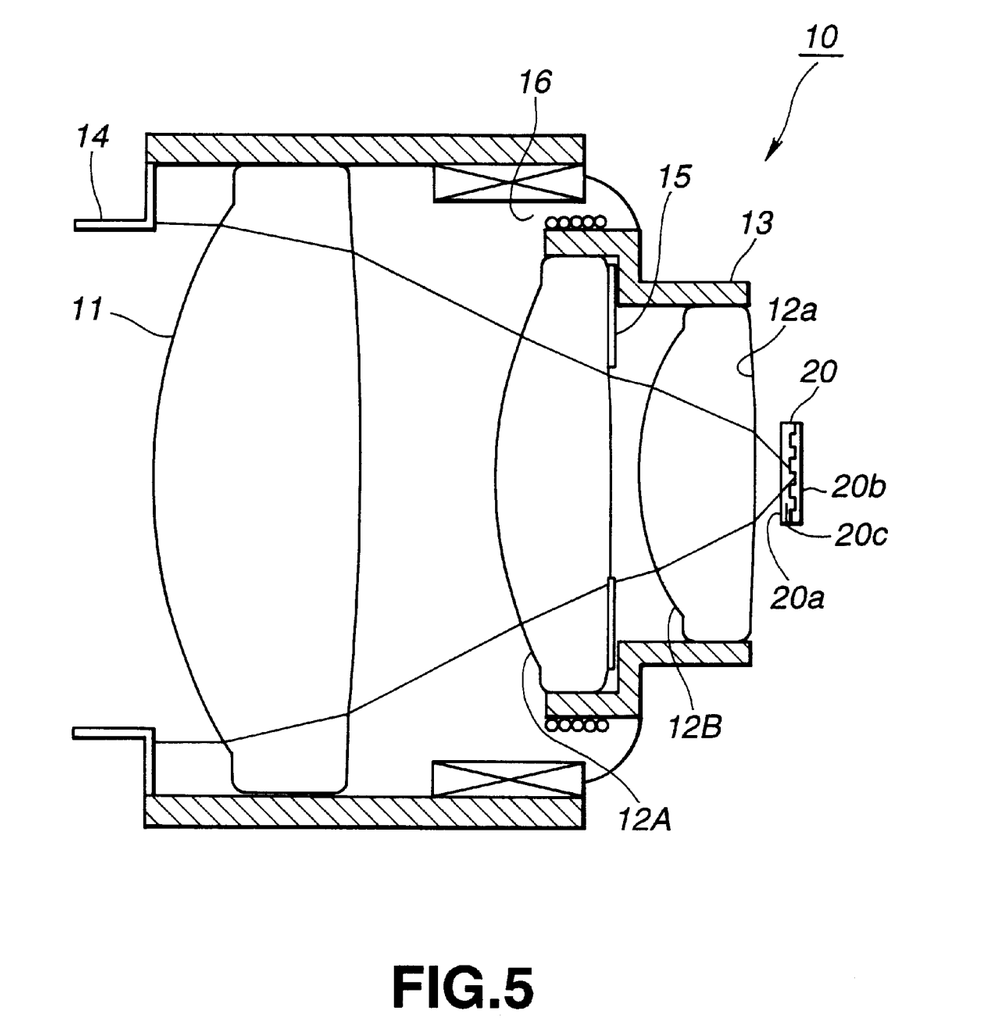
FIG. 5 is a cross-sectional view of an objective lens unit provided with three lenses adjusted for the thin-substrate disk.
Figure 6:
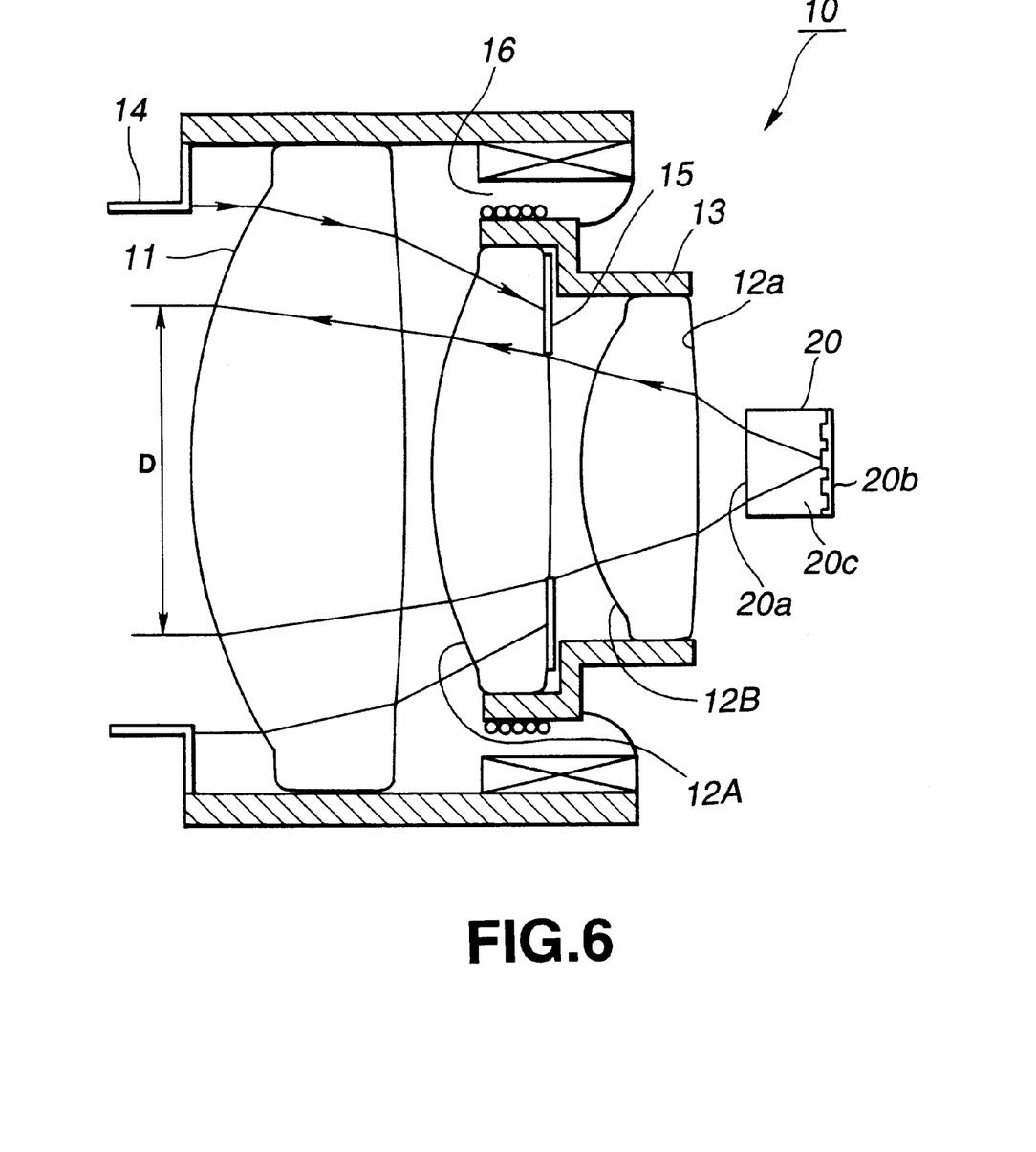
FIG. 6 is a cross-sectional view of the objective lens unit provided with three lenses adjusted for the DVD disk.

It should be noted that the objective lens unit 10 according to the present invention and the recording/reproduction apparatus 100 provided with this objective lens unit 10 are not limited to the case that the second lens 12 consists of a single lens as has been described. As modified examples, FIG. 5 and FIG. 6 show the objective lens unit 10 in which the second lens 12 consists of two lenses. This objective lens unit 10 consists of a first lens 11; a second lens 12A; a third lens 12B; a cylindrical frame 13 supporting this second lens 12A and the third lens 12B in such a manner that these lenses can be moved in the direction of the optical axis; a first diaphragm 14; a second diaphragm 15 provided on a plane of the second lens opposing to the third lens; a second lens drive unit 16; and an objective lens drive unit 17 not depicted. The objective lens unit 10 in FIG. 5 has been adjusted for the thin-substrate disk having a substrate thickness of 0.1 mm and NA of 0.77, whereas the objective lens unit 10 in FIG. 6 has been adjusted for the DVD disk having a substrate thickness of 0.6 mm and NA of 0.6. In FIG. 5, the spacing between the first lens 11 and the second lens 12A and the third lens 12B are set wide by the second lens drive unit 16, whereas in FIG. 5, the spacing is set narrow and the beam diameter is limited to D, lowering the NA. As shown in FIG. 5 and FIG. 6, the second diaphragm 12 need not be provided on the plane of the objective lens unit 10 opposing to the optical recording medium but can also be provided on the other surface of the lens. Furthermore, the second diaphragm 15 need not be provided on the surface of the lens but can be anywhere on the optical path.

As has thus far been described, the present invention provides an objective lens unit which can be adjusted simultaneously for different specifications of the substrate thickness and the NA of the optical recording medium. That is, a single objective lens unit can cope with different specifications of the optical recording medium instead of requiring complicated means such as a plurality of different lenses or diffraction-type hologram. Thus, the present invention enables to simplify the configuration of the objective lens unit, which improves productivity of the objective lens unit and reduces in size and weight of the product as well as reduces the production costs.

The objective lens unit according to the present invention is provided with a first lens and a second lens and by adjusting the distance between these lenses, can cope with different substrate thicknesses of the optical recording medium. It is convenient that a single objective lens can cope with different specifications of the optical recording medium. Moreover, even the substrate thickness changes in an optical recording medium, it is possible to obtain a stable focusing by changing the distance between the first and the second lenses.

Moreover, in the objective lens unit according to the present invention, the diaphragm for the NA is provided on the surface of the second lens. This diaphragm can be formed, for example, by a deposited film. Such a film can easily be formed and is stable for the environment. Because the deposited film does not require a mechanical support structure, it is possible to reduce the number of components. Consequently, it is possible to lower the production costs of the lens unit as well as simplify the maintenance work.

Furthermore, in the objective lens unit according to the present invention, the second lens is a convex lens having a spherical surface of a predetermined radius of curvature and a flat surface opposite to and in proximity to the optical recording medium. Because one of the surfaces of this convex lens is flat, it is easy to form a diaphragm on this flat surface.

Moreover, in the objective lens unit according to the present invention, it is possible that the second lens consists of two lenses. When using two lenses, it is possible to design to cover a greater range than when using a single lens. This also increases the number of planes on which a diaphragm can be formed, increasing the freedom of design.

In the recording/reproduction apparatus according to the present invention is provided with a lens unit whose NA can be adjusted for different specifications of the substrate thickness and NA of the optical recording medium. As has been described above, such a lens unit can reduce the size and weight as well as production costs. The recording/reproduction apparatus provided with this lens unit can cope with different specifications of the optical recording medium, which facilitates to use the apparatus for a user. It is possible to reduce the size, weight and production cost of the recording/reproduction apparatus itself.

Moreover, the objective lens unit provided in the recording/reproduction apparatus according to the present invention can cope with different specifications of substrate thicknesses of the optical recording medium by changing the distance between the first lens and the second lens. That is, with a single objective lens unit, it is possible to cope with different specifications of the optical recording medium.

Furthermore, in the objective lens unit provided in the recording/reproduction apparatus according to the present invention, the diaphragm for controlling the NA is provided on the surface of the second lens. This diaphragm can easily be formed, for example, by film deposition. Such a deposited film is stable for a change of environments. Consequently, it is possible to realize low production costs and easy maintenance.

What is claimed is:

1. An objective lens unit for applying a beam to an optical recording medium so as to read and/or record from/to said optical recording medium, said unit comprising:
    a first objective lens;
    a second objective lens;
    a cylindrical frame for movably supporting said second objective lens with respect to said first objective lens in a direction of an optical axis; and
    diaphragm means provided in the vicinity of said second objective lens and movable together with said second objective lens in the direction of the optical axis, for shading a part of the beam to be applied to said optical recording medium.

2. An objective lens unit as claimed in claim 1, wherein said second objective lens is provided on a side of the optical recording medium and the spacing between said first objective lens and said second objective lens is adjusted according to a substrate thickness of said optical recording medium.

3. An objective lens unit as claimed in claim 2, wherein said diaphragm is provided on a surface of said second objective lens.

4. An objective lens unit as claimed in claim 3, wherein said diaphragm is provided on a surface of said second objective lens opposite said optical recording medium.

5. An objective lens unit as claimed in claim 4, wherein said second objective lens provided in proximity to and opposite the optical recording medium is a convex lens having a convex spherical surface of a predetermined radius of curvature as an incident plane and a flat surface in proximity to and opposite a surface of said optical recording medium.

6. An objective lens unit as claimed in claim 1, further comprising a third objective lens supported by said cylindrical frame.

7. The objective lens unit of claim 6, wherein said second objective lens and said diaphragm are disposed in between said first objective lens and said third objective lens.

8. An objective lens unit as claimed in claim 1, wherein said unit further comprises a moving means for moving said cylindrical frame in the direction of the optical axis.

9. An objective lens unit as claimed in claim 1, wherein said unit further comprises a moving means for moving said cylindrical frame in a direction that orthogonally intersects the optical axis.

10. A recording/reproduction apparatus for applying a beam to an optical recording medium so as to read and/or record a signal from/to said optical recording medium, said apparatus comprising:
    a beam emitting section; and
    an objective lens unit for focusing the beam from the beam emitting section, on said optical recording medium,
    said objective lens unit including:
        a first objective lens;
        a second objective lens;
        a cylindrical frame for movably supporting said second objective lens with respect to said first objective lens in a direction of an optical axis; and
        diaphragm means provided in the vicinity of said second objective lens and movable together with this second objective lens in a direction of the optical axis.

11. A recording/reproduction apparatus as claimed in claim 10, wherein said second objective lens is provided on side of the optical recording medium and a spacing between said first objective lens and said second objective lens is adjusted according to a substrate thickness of the optical recording medium.

12. A recording/reproduction apparatus as claimed in claim 11, wherein said diaphragm is provided on a surface of said second objective lens.

13. A recording/reproduction apparatus as claimed in claim 10, where said second objective lens provided in proximity to and opposite the optical recording medium is a convex lens having a convex spherical surface of a predetermined radius of curvature as an incident plane and a flat surface in proximity to and opposite a surface of said optical recording medium.

14. A recording/reproduction apparatus as claimed in claim 10, wherein said objective lens unit further includes a moving means for moving said cylindrical frame in the direction of the optical axis.

15. A recording/reproduction apparatus as claimed in claim 10, wherein said objective lens unit further includes a moving means for moving said cylindrical frame in a direction that orthogonally intersects the optical axis.

16. The objective lens unit of claim 10, further comprising a third objective lens supported by said cylindrical frame.

17. The objective lens unit of claim 16, wherein said second objective lens and said diaphragm are disposed in between said first objective lens and said third objective lens.

18. An objective lens unit for applying a beam to an optical recording medium so as to read and/or record a signal from/to the optical recording medium, said unit comprising:

a first objective lens;

a second objective lens provided between said optical recording medium and said first objective lens hand having an optical axis which coincides with an optical axis of said first objective lens;

moving means for moving said first objective lens and said second objective lens relative to each other in the direction of the optical axis;

an actuator for moving said first objective lens and said second objective lens at least in the direction of said optical axis; and diaphragm means provided on a surface of said second objective lens opposite said optical recording medium and movable together with the second objective lens, for shading a part of the beam applied to said optical recording medium.

19. An objective lens unit as claimed in claim 18 wherein a spacing between said first objective lens and said second objective lens is adjusted according to a substrate thickness of said optical recording medium.

20. An objective lens unit as claimed in claim 18, wherein said second objective lens provided in proximity to and opposite the optical recording medium is a convex lens having a convex spherical surface of a predetermined radius of curvature as an incident plane and a flat surface in proximity to and opposite a surface of said optical recording medium.

21. A objective lens unit as claimed in claim 20, wherein said diaphragm means is provided on a surface of said second objective lens.

22. An objective lens unit as claimed in claim 18, wherein said actuator moves said first objective lens and said second objective lens further in a direction that orthogonally intersects the optical axis.

23. An objective lens unit as claimed in claim 18, wherein said first objective lens is moved in the direction of the optical axis by said actuator, whereas said second objective lens is moved by said moving means in the direction of the optical axis with respect to said first lens.

24. The objective lens unit of claim 18, further comprising a third objective lens supported by said cylindrical frame.

25. The objective lens unit of claim 24, wherein said second objective lens and said diaphragm are disposed in between said first objective lens and said third objective lens.

* * * * *

UNITED STATES PATENT AND TRADEMARK OFFICE
CERTIFICATE OF CORRECTION

PATENT NO. : 6,104,691  
DATED : August 15, 2000  
INVENTOR(S) : Kenji Yamamoto et al.

Page 1 of 1

It is certified that error appears in the above-identified patent and that said Letters Patent is hereby corrected as shown below:

<u>Column 11, claim 18,</u>  
Line 36, delete "hand", insert -- and --.

Signed and Sealed this

Twenty-sixth Day of February, 2002

*Attest:*

JAMES E. ROGAN  
*Attesting Officer*     *Director of the United States Patent and Trademark Office*